(12) United States Patent
Sugimori

(10) Patent No.: US 10,493,943 B2
(45) Date of Patent: Dec. 3, 2019

(54) CURTAIN AIRBAG, CURTAIN AIRBAG APPARATUS, AND METHOD FOR MANUFACTURING CURTAIN AIRBAG APPARATUS

(71) Applicant: Takata Corporation, Tokyo (JP)

(72) Inventor: Sakae Sugimori, Shiga (JP)

(73) Assignee: JOYSON SAFETY SYSTEMS JAPAN K. K., Tokyo (JP)

( * ) Notice: Subject to any disclaimer, the term of this patent is extended or adjusted under 35 U.S.C. 154(b) by 107 days.

(21) Appl. No.: 15/866,912

(22) Filed: Jan. 10, 2018

(65) Prior Publication Data

US 2018/0201220 A1 Jul. 19, 2018

(30) Foreign Application Priority Data

Jan. 18, 2017 (JP) .................................. 2017-006531

(51) Int. Cl.
*B60R 21/232* (2011.01)
*B60R 21/2338* (2011.01)
*B60R 21/213* (2011.01)
*B60R 21/237* (2006.01)
*B60R 21/02* (2006.01)
(Continued)

(52) U.S. Cl.
CPC .......... *B60R 21/232* (2013.01); *B60R 21/213* (2013.01); *B60R 21/237* (2013.01); *B60R 21/2338* (2013.01); *B60R 2021/0009* (2013.01); *B60R 2021/0018* (2013.01); *B60R 2021/028* (2013.01); *B60R 2021/2685* (2013.01)

(58) Field of Classification Search
CPC ... B60R 21/232; B60R 21/237; B60R 21/213; B60R 21/2338; B60R 2021/23386; B60R 2021/0009; B60R 2021/0018; B60R 2021/2685; B60R 2021/028
See application file for complete search history.

(56) References Cited

U.S. PATENT DOCUMENTS

| 8,579,323 B2 | 11/2013 | Kato et al. |
| 8,628,112 B2 | 1/2014 | Kato et al. |
| 8,636,301 B1 | 1/2014 | Wang et al. |

(Continued)

FOREIGN PATENT DOCUMENTS

| DE | 102010056342 | 7/2012 |
| JP | 2006-298334 | 11/2006 |

(Continued)

*Primary Examiner* — Drew J Brown
(74) *Attorney, Agent, or Firm* — IPUSA, PLLC

(57) ABSTRACT

A curtain airbag is folded and stored in an upper portion of a vehicle body under normal circumstances, and is inflated and expanded along a side window in emergency situations. The curtain airbag includes a front chamber to be inflated and expanded along the side window of a front seat of the vehicle body; a first gas supply port to supply gas to the front chamber, the first gas supply port being disposed at an upper portion of the front chamber; a sub-chamber smaller than the front chamber and disposed above the front chamber; and a second gas supply port disposed rearward of the sub-chamber, and communicated with and narrower than the first gas supply port. The sub-chamber is stored in a state of being folded on a front surface of the front chamber on a vehicle interior side at a portion of the second gas supply port.

8 Claims, 6 Drawing Sheets

(51) Int. Cl.
  *B60R 21/00*    (2006.01)
  *B60R 21/268*   (2011.01)

(56) References Cited

U.S. PATENT DOCUMENTS

| | | | |
|---|---|---|---|
| 8,899,617 B2 | 12/2014 | Fukawatase et al. | |
| 9,487,180 B2* | 11/2016 | Nakashima | B60R 21/233 |
| 9,539,978 B2* | 1/2017 | Mazanek | B60R 21/232 |
| 9,701,272 B2* | 7/2017 | Massa | B60R 21/213 |
| 9,744,936 B2* | 8/2017 | Kruse | B60R 21/232 |
| 10,081,328 B2* | 9/2018 | Choi | B60R 21/214 |
| 2009/0102169 A1 | 4/2009 | Gloeckler et al. | |
| 2010/0025971 A1* | 2/2010 | Steinbach | B60R 21/232 |
| | | | 280/729 |
| 2011/0079990 A1* | 4/2011 | Cheal | B60R 21/213 |
| | | | 280/730.2 |
| 2013/0168950 A1 | 7/2013 | Nakamura et al. | |
| 2013/0234422 A1* | 9/2013 | Wipasuramonton | B60R 21/232 |
| | | | 280/730.2 |
| 2013/0270805 A1 | 10/2013 | Kruse et al. | |
| 2013/0341894 A1* | 12/2013 | Nakashima | B60R 21/233 |
| | | | 280/730.2 |
| 2014/0042732 A1* | 2/2014 | Taguchi | B60R 21/233 |
| | | | 280/729 |
| 2014/0217707 A1 | 8/2014 | Konishi et al. | |
| 2014/0217709 A1* | 8/2014 | Fukawatase | B60R 21/232 |
| | | | 280/730.2 |
| 2015/0145234 A1* | 5/2015 | Wang | B60R 21/232 |
| | | | 280/729 |
| 2015/0151708 A1* | 6/2015 | Kawamura | B60R 21/232 |
| | | | 280/728.2 |
| 2016/0001732 A1 | 1/2016 | Asada et al. | |
| 2016/0114754 A1* | 4/2016 | Kawamura | B60R 21/2334 |
| | | | 280/728.2 |
| 2017/0182967 A1* | 6/2017 | Suzuki | B60R 21/213 |
| 2018/0050652 A1* | 2/2018 | Jung | B60R 21/232 |
| 2019/0126879 A1* | 5/2019 | Shimizu | B60R 21/213 |

FOREIGN PATENT DOCUMENTS

| | | |
|---|---|---|
| JP | 4432699 | 3/2010 |
| JP | 2012-111423 | 6/2012 |
| JP | 5302049 | 10/2013 |
| WO | 2007/110302 | 10/2007 |
| WO | 2012/008241 | 1/2012 |
| WO | 2012/035949 | 3/2012 |
| WO | 2012/124548 | 9/2012 |
| WO | 2012/124549 | 9/2012 |
| WO | 2013/031980 | 3/2013 |
| WO | 2014/042040 | 3/2014 |
| WO | 2014/132810 | 9/2014 |

* cited by examiner

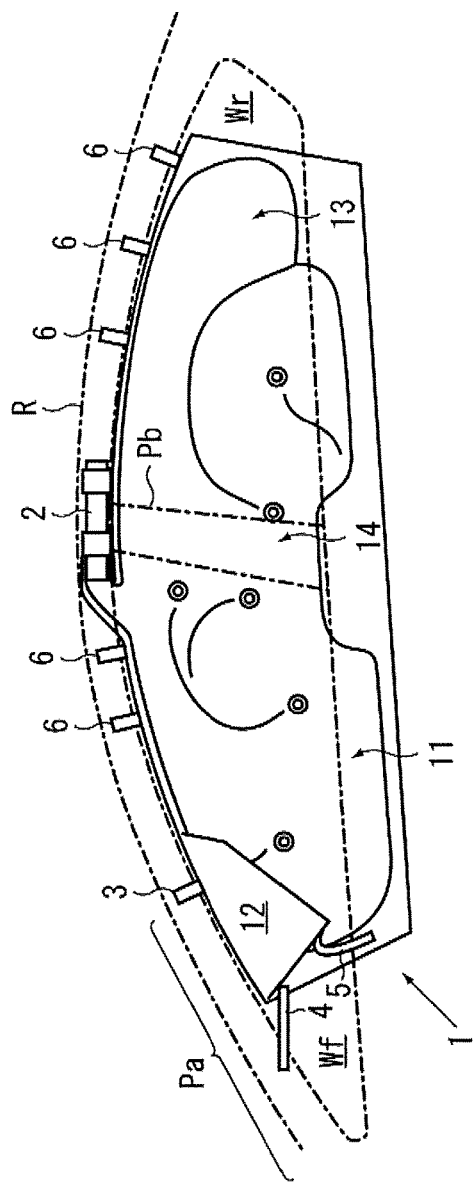

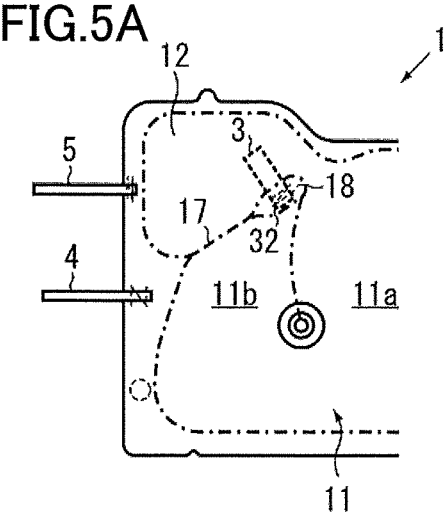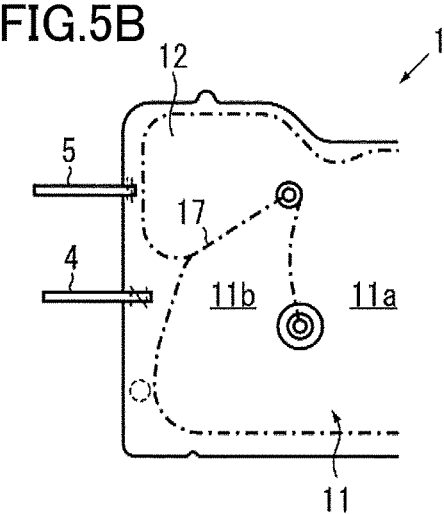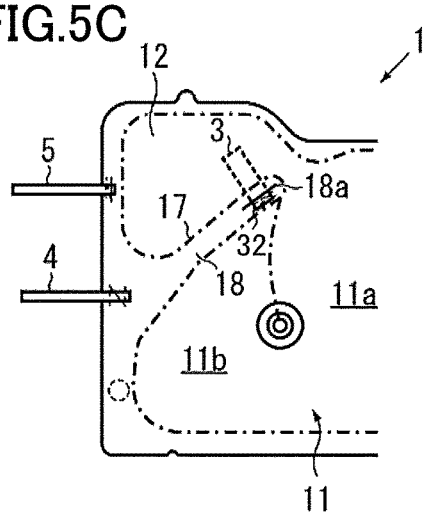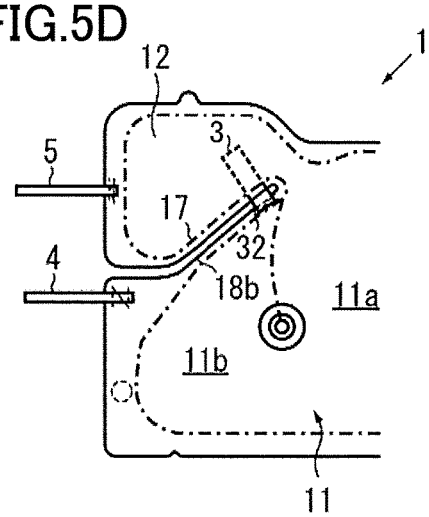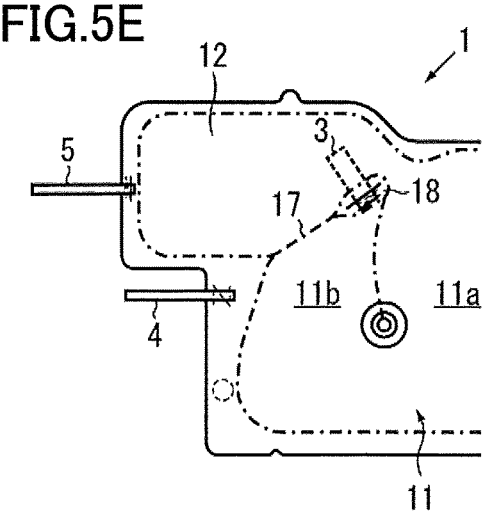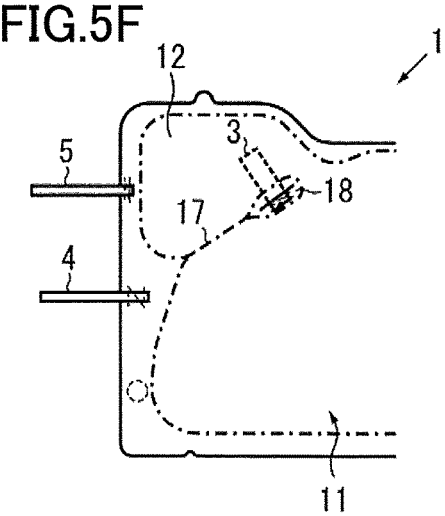

CURTAIN AIRBAG, CURTAIN AIRBAG APPARATUS, AND METHOD FOR MANUFACTURING CURTAIN AIRBAG APPARATUS

BACKGROUND OF THE INVENTION

1. Field of the Invention

The present invention relates to a curtain airbag, a curtain airbag apparatus, and a method for manufacturing a curtain airbag apparatus, and more particularly to a curtain airbag having a sub-chamber covering an A-pillar of a vehicle, a curtain airbag apparatus, and a method for manufacturing a curtain airbag apparatus.

2. Description of the Related Art

Generally, a vehicle such as an automobile is equipped with an airbag apparatus for absorbing the impact imposed on an occupant by inflating and expanding an airbag in the vehicle interior, in the event of an emergency such as a collision or overturning. In particular, a curtain airbag apparatus covering the side window may be mounted in order to prevent the occupant from being discharged when the vehicle overturns (rolls over).

Such a curtain airbag apparatus generally includes a curtain airbag that is folded and stored in an upper portion of a vehicle body under normal circumstances, and that is inflated and expanded along a side window in emergency situations, and an inflator that supplies gas to the curtain airbag. In an emergency, gas is supplied from the inflator to the curtain airbag, and the curtain airbag is discharged into the vehicle interior, and inflated and expanded, along the side window.

Incidentally, at the time of overturning or an oblique collision of the vehicle, the occupant sometimes moves toward the A pillar (front pillar) of the vehicle, and there is a need to prevent the occupant from colliding with the A pillar or being discharged outside the vehicle from the vicinity of the A pillar. For example, in a curtain airbag apparatus described in Patent Document 1, a curtain airbag in which a chamber covering the side window is expanded so as to cover the A pillar, is disclosed.

Patent Document 1: Japanese Patent No. 4432699

However, the curtain airbag apparatus described in Patent Document 1 has a problem that the size of the airbag tends to be increased, because the chamber covering the conventional side window is expanded. When the size of the airbag is increased, problems such as an increase in the weight of the base fabric and an increase in weight and cost due to an increase in the performance of the inflator, are induced.

Accordingly, there may be a need to provide a curtain airbag, a curtain airbag apparatus, and a method for manufacturing a curtain airbag apparatus, capable of covering the A pillar while reducing the size of the curtain airbag.

SUMMARY OF THE INVENTION

It is a general object of the present invention to provide a curtain airbag, a curtain airbag apparatus, and a method for manufacturing a curtain airbag apparatus that substantially obviates one or more problems caused by the limitations and disadvantages of the related art.

According to an embodiment, a curtain airbag is folded and stored in an upper portion of a vehicle body under normal circumstances, and is inflated and expanded along a side window in emergency situations. The curtain airbag includes a front chamber configured to be inflated and expanded along the side window of a front seat of the vehicle body; a first gas supply port configured to supply gas to the front chamber, the first gas supply port being disposed at an upper portion of the front chamber; a sub-chamber that is smaller than the front chamber and that is disposed above the front chamber; and a second gas supply port that is disposed rearward of the sub-chamber, the second gas supply port communicating with the first gas supply port, and being narrower than the first gas supply port. The sub-chamber is stored in a state of being folded on a front surface of the front chamber on a side facing an interior of the vehicle body at a portion of the second gas supply port.

Furthermore, according to an embodiment, a curtain airbag apparatus includes a curtain airbag that is folded and stored in an upper portion of a vehicle body under normal circumstances, and that is inflated and expanded along a side window in emergency situations; and an inflator configured to supply gas to the curtain airbag. The curtain airbag includes a front chamber configured to be inflated and expanded along the side window of a front seat of the vehicle body; a first gas supply port configured to supply gas to the front chamber, the first gas supply port being disposed at an upper portion of the front chamber; a sub-chamber that is smaller than the front chamber and that is disposed above the front chamber; and a second gas supply port that is disposed rearward of the sub-chamber, that is communicated with the first gas supply port, and that is narrower than the first gas supply port. The sub-chamber is stored in a state of being folded on a front surface of the front chamber on a side facing an interior of the vehicle body at a portion of the second gas supply port.

In the curtain airbag and the curtain airbag apparatus described above, a boundary line partitioning the front chamber and the sub-chamber may be disposed along an A pillar of the vehicle body.

Furthermore, the curtain airbag may include a connecting member including a first end portion connected to the vehicle body, and a second end portion connected to a portion adjacent to the second gas supply port on the boundary line. Furthermore, the first end portion may be connected rearward of a rear end portion of a garnish disposed on the A pillar.

Furthermore, the curtain airbag may include a tether including a first end portion connected to a front of the sub-chamber, and a second end portion connected to a front of the front chamber. The length of the tether may be shorter than a linear distance between a connection point of the first end portion and a connection point of the second end portion.

Furthermore, the curtain airbag may include a non-inflatable portion disposed on a boundary line partitioning the front chamber and the sub-chamber. The non-inflatable portion may include a slit formed along the boundary line.

Furthermore, according to an embodiment, there is provided a method for manufacturing a curtain airbag apparatus including a curtain airbag that is folded and stored in an upper portion of a vehicle body under normal circumstances, and that is inflated and expanded along a side window in emergency situations, and an inflator configured to supply gas to the curtain airbag. The curtain airbag includes a front chamber configured to be inflated and expanded along the side window of a front seat of the vehicle body; a first gas supply port configured to supply the gas to the front chamber, the first gas supply port being disposed at an upper portion of the front chamber; a sub-chamber that is smaller than the front chamber and that is disposed above the front chamber; and a second gas supply port that is disposed rearward of the sub-chamber, the second gas supply port is communicating with the first gas supply port, and being narrower than the first gas supply port. The method includes a sub-chamber folding step of folding the sub-chamber on a front surface of the front chamber on a side facing an interior of the vehicle body at a portion of the second gas supply port; and an airbag folding step of folding a folded body obtained by the sub-chamber folding step, into a state where the folded body can be stored in the upper portion of the vehicle body.

Here, the curtain airbag includes a tether including a first end portion connected to a front of the sub-chamber, and a second end portion connected to a front of the front chamber. The method may further include a tether sewing step of sewing the first end portion of the tether to the sub-chamber before the sub-chamber folding step, and sewing the second end portion of the tether to the front chamber after the sub-chamber folding step.

According to at least one embodiment, according to the curtain airbag, the curtain airbag apparatus, and the method for manufacturing the curtain airbag apparatus, since the sub-chamber covering the A pillar is disposed separately from the front chamber covering the side window, it is possible to cover the A pillar while reducing the size of the curtain airbag. In particular, the gas supply port of the sub-chamber is formed to be smaller than the gas supply port of the front chamber, and the sub-chamber is folded on the front surface of the front chamber at the time of storage. Thus, when inflating and expanding the curtain airbag, it is possible to inflate and expand the sub-chamber after inflating and expanding the front chamber first. Furthermore, it is possible to inflate and expand the sub-chamber while suppressing the interference between the A pillar garnish and the sub-chamber.

BRIEF DESCRIPTION OF THE DRAWINGS

FIGS. 2A through 2C are plan views showing a folding method of the curtain airbag shown in FIG. 1, in which FIG. 2A shows a sub-chamber folding step, FIG. 2B shows a tether sewing step, and FIG. 2C shows an airbag folding step;

FIGS. 3A through 3C are side views showing the behavior of inflation and expansion of the curtain airbag shown in FIG. 1, in which FIG. 3A shows the storage state, FIG. 3B shows the initial state of inflation and expansion, and FIG. 3C shows the inflation and expansion completion state;

FIGS. 4A and 4B are views showing the curtain airbag according to the second embodiment of the present invention, in which FIG. 4A is a planar expanded view and FIG. 4B is a side view of the initial state of inflation and expansion; and FIGS. 5A through 5F are partial plan views showing the curtain airbag according to other embodiments of the present invention, in which FIG. 5A shows a third embodiment, FIG. 5B shows a fourth embodiment, FIG. 5C shows a fifth embodiment, FIG. 5D shows a sixth embodiment, FIG. 5E shows a seventh embodiment, and FIG. 5F shows an eighth embodiment.

DESCRIPTION OF THE PREFERRED EMBODIMENTS

Figure 1:
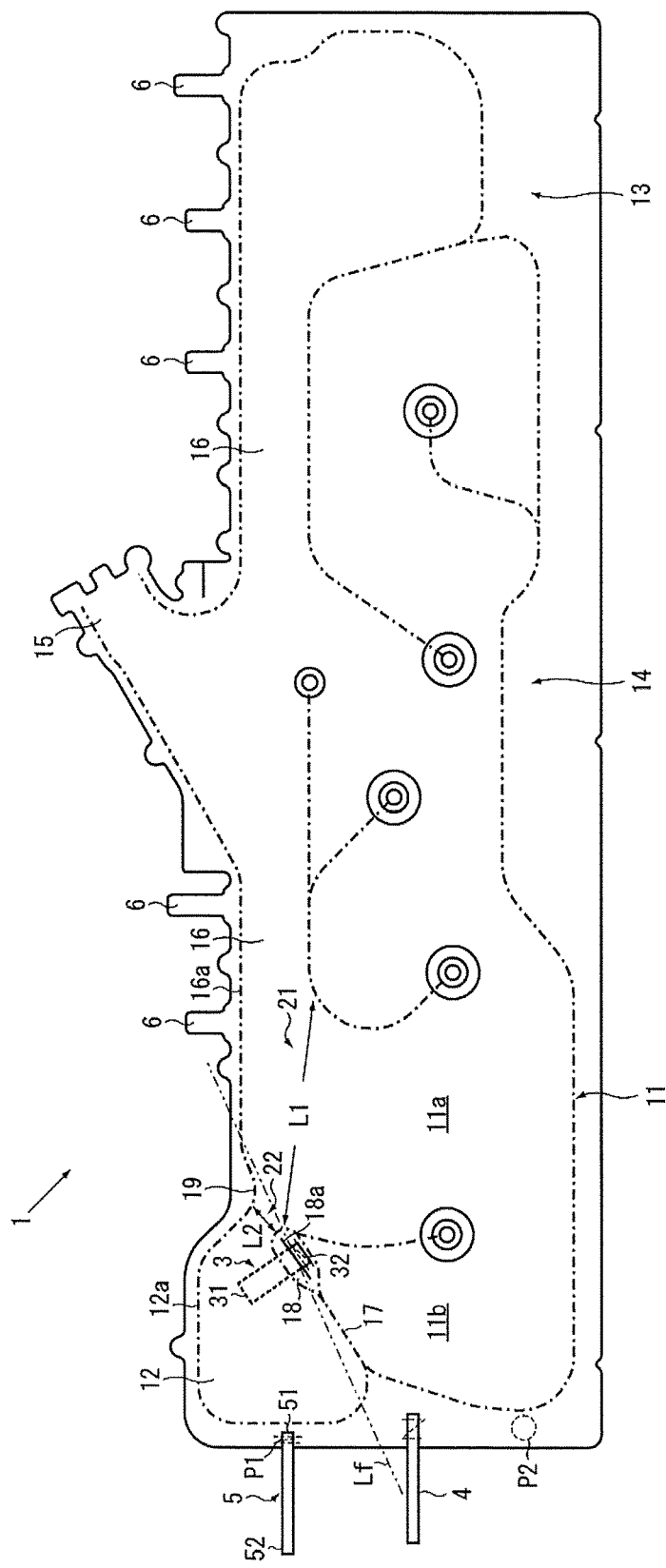
FIG. 1 is a planar expanded view showing a curtain airbag according to a first embodiment of the present invention.
Figure 2A:
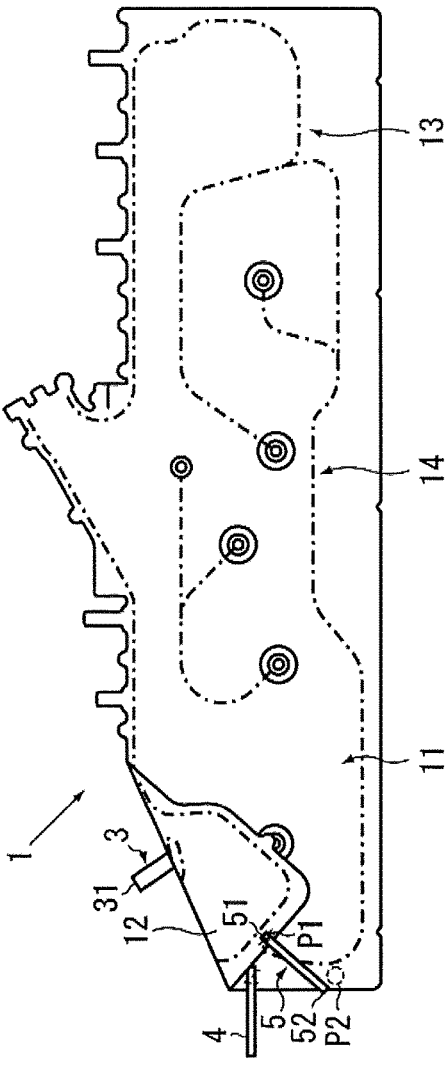
Figure 2B:
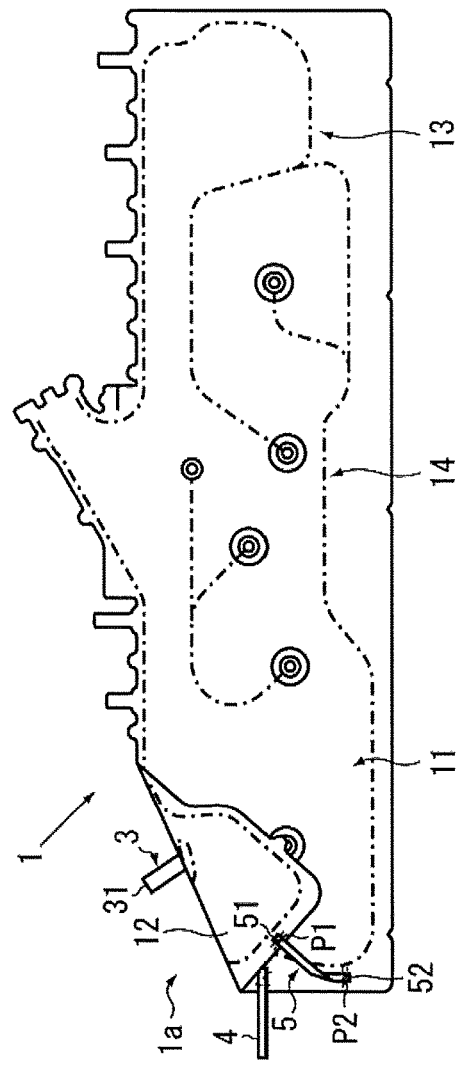
Figure 2C:
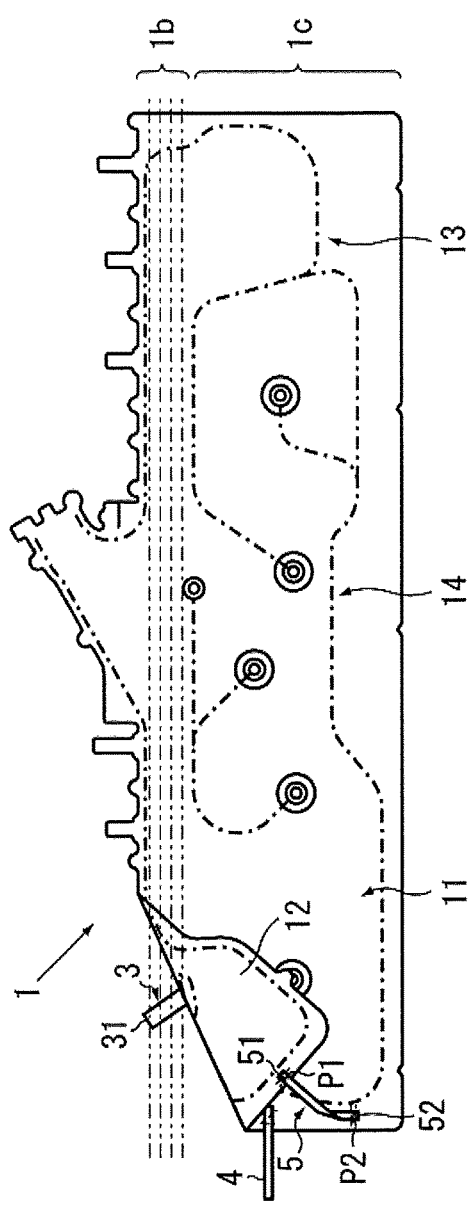
Figure 3A:
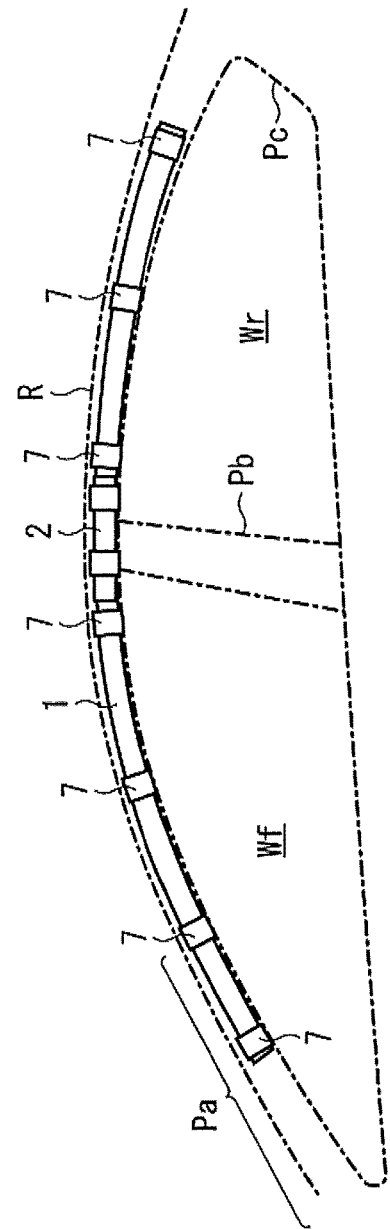

In the following, embodiments of the present invention will be described with reference to FIGS. 1 to 5F. Here, FIG. 1 is a planar expanded view showing a curtain airbag according to a first embodiment of the present invention. FIGS. 2A through 2C are plan views showing a folding method of the curtain airbag shown in FIG. 1, in which FIG. 2A shows a sub-chamber folding step, FIG. 2B shows a tether sewing step, and FIG. 2C shows an airbag folding step. FIGS. 3A through 3C are side views showing the behavior of inflation and expansion of the curtain airbag shown in FIG. 1, in which FIG. 3A shows the storage state, FIG. 3B shows the initial state of inflation and expansion, and FIG. 3C shows the inflation and expansion completion state.

As shown in FIGS. 1 to 3C, a curtain airbag 1 according to the first embodiment of the present invention is folded and stored in the upper portion of the vehicle body under normal circumstances, and is inflated and expanded along a side window in emergency situations. The curtain airbag 1 includes a front chamber 11 that is inflated and expanded along a side window Wf of a front seat of the vehicle; a first gas supply port 21 that is disposed at the upper portion of the front chamber 11 and that supplies gas to the front chamber 11; a sub-chamber 12 that is disposed above the front chamber 11 and that is smaller than the front chamber 11; and a second gas supply port 22 that is disposed rearward of the sub-chamber 12, that is communicated with the first gas supply port 21, and that is narrower than the first gas supply port 21. The sub-chamber 12 is stored in a folded state on the front surface of the front chamber 11 on the vehicle interior side at the portion of the second gas supply port 22.

For example, as shown in FIG. 3A, the vehicle body includes an A pillar Pa disposed at the front of the vehicle, a B pillar Pb disposed at the center of the vehicle, a C pillar Pc disposed at the rear of the vehicle, and a roof side rail R connected to the upper portions of the A pillar Pa, the B pillar Pb, and the C pillar Pc. Furthermore, a side window Wf of the front seat of the vehicle is disposed at a portion surrounded by the A pillar Pa, the roof side rail R, and the B pillar Pb. A side window Wr of the rear seat of the vehicle is disposed at a portion surrounded by the B pillar Pb, the roof side rail R, and the C pillar Pc. Note that in the present embodiment, "front" means the forward direction of the vehicle, and "rear" means the backward direction of the vehicle.

Furthermore, as shown in FIG. 1, the curtain airbag 1 includes the front chamber 11 covering the side window Wf of the front seat of the vehicle, a rear chamber 13 covering the side window Wr of the rear seat of the vehicle, and a center chamber 14 disposed between the front chamber 11 and the rear chamber 13. Furthermore, an inflator insertion opening 15 for inserting the tip of the inflator is formed at the upper portion of the middle portion of the curtain airbag 1. Furthermore, a gas supply path 16, which is for distributing and supplying gas to each chamber, is communicated with the inflator insertion opening 15.

Note that in the curtain airbag 1, the chambers are partitioned by sewing together a front panel to be exposed to the vehicle interior side and a rear panel to be disposed on the window side at the time of inflation and expansion. In FIG. 1, the suture line is indicated by a chain line. Furthermore, in the present embodiment, the "front surface" means the surface on the front panel side, and the "rear surface" means the surface on the rear panel side.

Furthermore, the curtain airbag 1 according to the present embodiment is characterized by the sub-chamber 12 covering the A pillar Pa; and the configurations of the front chamber 11, the rear chamber 13, and the center chamber 14 are not limited to the configurations shown in the drawings.

For example, if the vehicle body has a D pillar, another chamber may be added rearward of the rear chamber 13.

As shown in FIG. 1, the front chamber 11 includes the first gas supply port 21 that is communicated with the gas supply path 16 in the upper portion. Furthermore, the front chamber 11 includes, for example, a front main chamber 11a and a front sub-chamber 11b disposed in front of the front main chamber 11a. The front main chamber 11a and the front sub-chamber 11b are communicated with each other at the lower portion of the curtain airbag 1 as shown in the drawings. Therefore, the gas, which is supplied from the first gas supply port 21 to the front chamber 11, first expands the front main chamber 11a and then expands the front sub-chamber 11b.

As shown in FIG. 1, the sub-chamber 12 is disposed above the front chamber 11 (for example, the front sub-chamber 11b), and is partitioned from the front chamber 11 by a boundary line 17. Here, the boundary line 17 is formed by a suture line. The boundary line 17 is obliquely formed so that the rear side is higher than the front side, so as to be disposed along the A pillar Pa, for example. In the present embodiment, "along the A pillar Pa" means to allow a range of approximately ±5° with respect to the inclination angle of the A pillar Pa.

Furthermore, a non-inflatable portion 18 surrounded by a suture line is formed at an end portion on the rear side on the boundary line 17. A connecting member 3 for connecting the curtain airbag 1 to the vehicle body, is connected to the non-inflatable portion 18. The connecting member 3 includes a first end portion 31 connected to the vehicle body, and a second end portion 32 connected to a portion (that is, the non-inflatable portion 18) adjacent to the second gas supply port 22 on the boundary line 17. Furthermore, the non-inflatable portion 18 has a slit 18a formed along the boundary line 17, and the second end portion 32 of the connecting member 3 may be guided from the rear surface to the front surface of the curtain airbag 1, so as to be sewn to the non-inflatable portion 18.

With such a configuration, the sewing of the connecting member 3 can be performed from the front side of the curtain airbag 1, and the number of working steps can be reduced. Furthermore, by forming the slit 18a in the non-inflatable portion 18, the flexibility of the sub-chamber 12 with respect to the front chamber 11 can be improved, and the sub-chamber 12 can be easily folded.

Furthermore, the volume of the sub-chamber 12 is set to be smaller than the volume of the front chamber 11. A suture line 12a that defines the outer periphery of the sub-chamber 12 may have a portion that protrudes upward from a linear portion 16a that forms the gas supply path 16. Furthermore, a suture line connecting the suture line 12a of the sub-chamber 12 and the linear portion 16a of the gas supply path 16, may have a protruding portion 19 protruding downward. A width L2 of the second gas supply port 22 is narrowed by the non-inflatable portion 18 and the protruding portion 19. Assuming that the width of the first gas supply port 21 is a width L1, the width L2 of the second gas supply port 22 is narrower than the width L1 of the first gas supply port 21.

Furthermore, as shown in FIG. 1, a strap 4 for connecting the curtain airbag 1 to the vehicle body (the A pillar Pa) may be connected to the front of the front chamber 11 of the curtain airbag 1. For example, as shown in FIG. 3B, the front end of the strap 4 is connected to the A pillar Pa, and the rear end of the strap 4 is sewn to, for example, substantially the middle portion in the height direction at the front end of the curtain airbag 1. The strap 4 is a component for positioning the curtain airbag 1 at the time of inflation and expansion.

Furthermore, a plurality of tabs 6 are disposed on the upper portion of the curtain airbag 1, and these tabs 6 are also connected to the vehicle body. Therefore, the curtain airbag 1 is positioned by the connecting member 3, the strap 4 and the tabs 6 at the time of inflation and expansion.

Furthermore, as shown in FIG. 3C, the curtain airbag 1 may have a tether 5 that holds the bent state of the sub-chamber 12 during inflation and expansion. The tether 5 has a first end portion 51 connected to the front of the sub-chamber 12 and a second end portion 52 connected to the front of the front chamber 11, and the length of the tether 5 is shorter than the linear distance between a connection point P1 of the first end portion 51 and a connection point P2 of the second end portion 52. In FIG. 1, as a matter of convenience of description, the position of the connection point P2 is displayed by being virtually surrounded by a circle of broken lines. Note that the tether 5 can be omitted as necessary.

Furthermore, the curtain airbag 1 is folded back so that the sub-chamber 12 overlaps the front surface of the front chamber 11 at a folding line Lf indicated by a two-dot chain line in FIG. 1. The folding line Lf is set substantially along the boundary line 17 of the sub-chamber 12 and is set to cross the second gas supply port 22. By folding the sub-chamber 12 in advance as described above, it is possible to suppress the supply of gas from the second gas supply port 22 to the sub-chamber 12 in the initial stage of inflation and expansion of the curtain airbag 1.

Next, a method of folding the curtain airbag 1 will be described with reference to FIGS. 2A through 2C. As advance preparation of folding the curtain airbag 1, as shown in FIG. 1, the second end portion 32 of the connecting member 3, the rear end of the strap 4, and the first end portion 51 of the tether 5 are respectively sewn to predetermined positions of the curtain airbag 1.

The folding method of the curtain airbag 1 includes a sub-chamber folding step of folding the sub-chamber 12 on the front surface of the vehicle interior side of the front chamber 11, at the portion of the second gas supply port 22; a tether sewing step of sewing the second end portion 52 of the tether 5 to the curtain airbag 1; and an airbag folding step of folding a folded body 1a after the sub-chamber folding step, into a state where the folded body 1a can be stored in the upper portion of the vehicle body.

The sub-chamber folding step is a step of folding a portion of the curtain airbag 1 along the folding line Lf shown in FIG. 1, as shown in FIG. 2A. At this time, it is preferable to fold the curtain airbag 1 including the sub-chamber 12 so as to seal the second gas supply port 22 of the sub-chamber 12. By folding in such a manner, the second gas supply port 22 can be temporarily choked, when the curtain airbag 1 is inflated and expanded.

The tether sewing step is a step of sewing the second end portion 52 of the tether 5 to the front portion of the front chamber 11, as shown in FIG. 2B. Specifically, the second end portion 52 of the tether 5 is sewn to the position of the connection point P2 shown in FIG. 1. At this time, since the length of the tether 5 is formed to be shorter than the linear distance between the connection point P1 and the connection point P2, when the curtain airbag 1 is inflated and expanded, the sub-chamber 12 is pulled by the tether 5 and held in a bent state with respect to the front chamber 11.

The airbag folding step is a step of folding the folded body 1a shown in FIG. 2B in the vertical direction. Specifically, a lower portion 1c of the folded body 1a is roll-folded, and an upper portion 1b of the folded body 1a is bellows-folded. Note that the folding method of the airbag folding step is merely one example. For example, the entire folded body 1*a* including the upper portion 1*b* and the lower portion 1*c* may be bellows-folded, or the entire folded body 1*a* including the upper portion 1*b* and the lower portion 1*c* may be roll-folded. After the airbag folding step, an inflator 2 shown in FIG. 3A is inserted into the inflator insertion opening 15 shown in FIG. 1 and fixed to the curtain airbag 1.

Next, the inflation and expansion behavior of the curtain airbag 1 will be described with reference to FIGS. 3A through 3C. Note that in FIG. 3A through FIG. 3C, as a matter of convenience of description, the vehicle body is indicated by a chain line. As shown in FIG. 3A, the curtain airbag apparatus according to the present embodiment includes the curtain airbag 1 that is folded and stored in the upper portion of the vehicle body under normal circumstances, and that is inflated and expanded along the side windows Wf, Wr in emergency situations, and the inflator 2 that supplies gas to the curtain airbag 1.

As shown in FIG. 3A, the curtain airbag 1 after the airbag folding step is held in a folded state by a plurality of wrapping members 7. As shown in FIG. 3A, in the curtain airbag 1 folded in a substantially rod shape, the first end portion 31 of the connecting member 3, the front end of the strap 4, the tips of the tabs 6, and the inflator 2 are connected to the vehicle body, and the curtain airbag 1 is stored in the roof side rail R on the upper portion of the vehicle body. At this time, the portion of the curtain airbag 1 including the sub-chamber 12, is stored in the A pillar Pa as shown in the drawing.

In the event of an emergency such as a collision or rolling over (overturning) of the vehicle, the inflator 2 operates and gas is supplied to the curtain airbag 1. The gas supplied to the curtain airbag 1 is supplied to the front chamber 11, the rear chamber 13, and the center chamber 14 through the gas supply path 16, the bellows-folded portion is first inflated and expanded, and the curtain airbag 1 is discharged into the vehicle interior from the roof side rail R. At this time, a portion of the curtain airbag 1 including the sub-chamber 12 is simultaneously discharged from the A pillar Pa into the vehicle interior.

Next, the gas supplied to the curtain airbag 1 inflates and expands the roll-folded portion of the curtain airbag 1, and the curtain airbag 1 shifts to the state shown in FIG. 3B. At this time, since the sub-chamber 12 is folded on the front surface of the front chamber 11, the portion of the second gas supply port 22 is sealed by this folding, and a choked state is temporarily maintained. Therefore, in the initial state of inflation and expansion shown in FIG. 3B, gas is not yet supplied to the sub-chamber 12, and the folded state is maintained.

Then, as the inflation and expansion of the front chamber 11 progresses, the folded state of the sub-chamber 12 is gradually released and the gas pressure at the second gas supply port 22 rises. At a certain stage, gas starts to be supplied to the sub-chamber 12 from the second gas supply port 22, and as shown in FIG. 3C, the sub-chamber 12 is inflated and expanded. At this time, since the tether 5 is connected between the sub-chamber 12 and the front chamber 11, the sub-chamber 12 is held in a bent state with respect to the front chamber 11.

According to the curtain airbag 1 according to the present embodiment described above, since the sub-chamber 12 covering the A pillar Pa is disposed separately from the front chamber 11 covering the side window Wf, it is possible to cover the A pillar Pa while reducing the size of the curtain airbag 1. In particular, the second gas supply port 22 of the sub-chamber 12 is formed to be smaller than the first gas supply port 21 of the front chamber 11, and the sub-chamber 12 is folded on the front surface of the front chamber 11 at the time of storage. Thus, when inflating and expanding the curtain airbag 1, it is possible to inflate and expand the sub-chamber 12 after inflating and expanding the front chamber 11 first. Furthermore, it is possible to inflate and expand the sub-chamber 12 while suppressing the interference between the A pillar garnish and the sub-chamber 12.

Figure 4A:
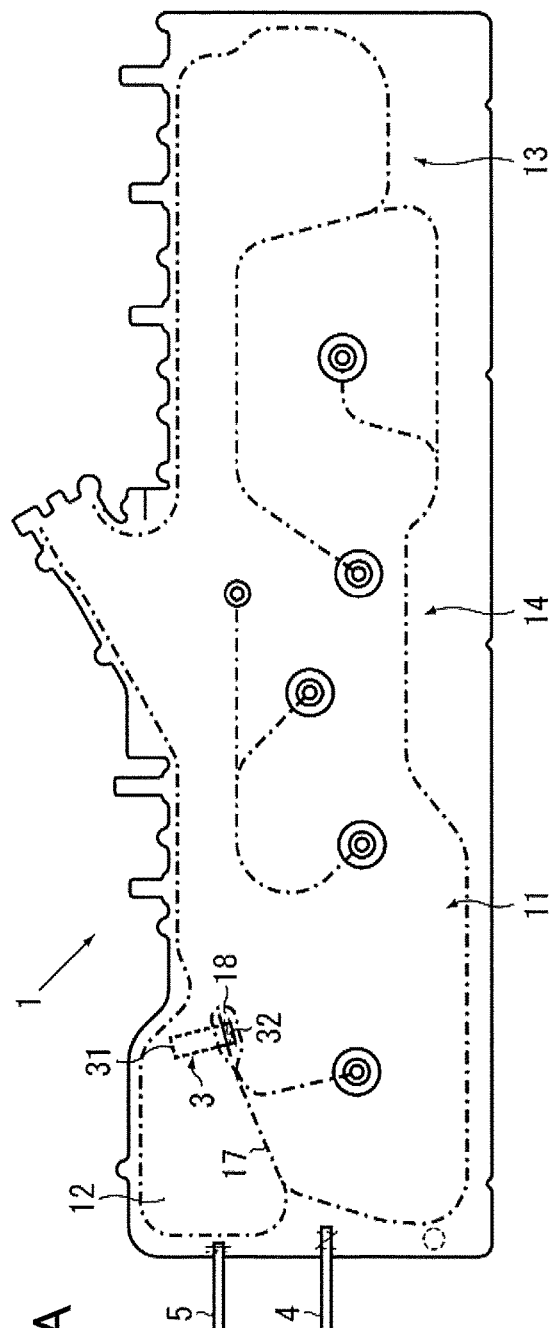
Figure 4B:
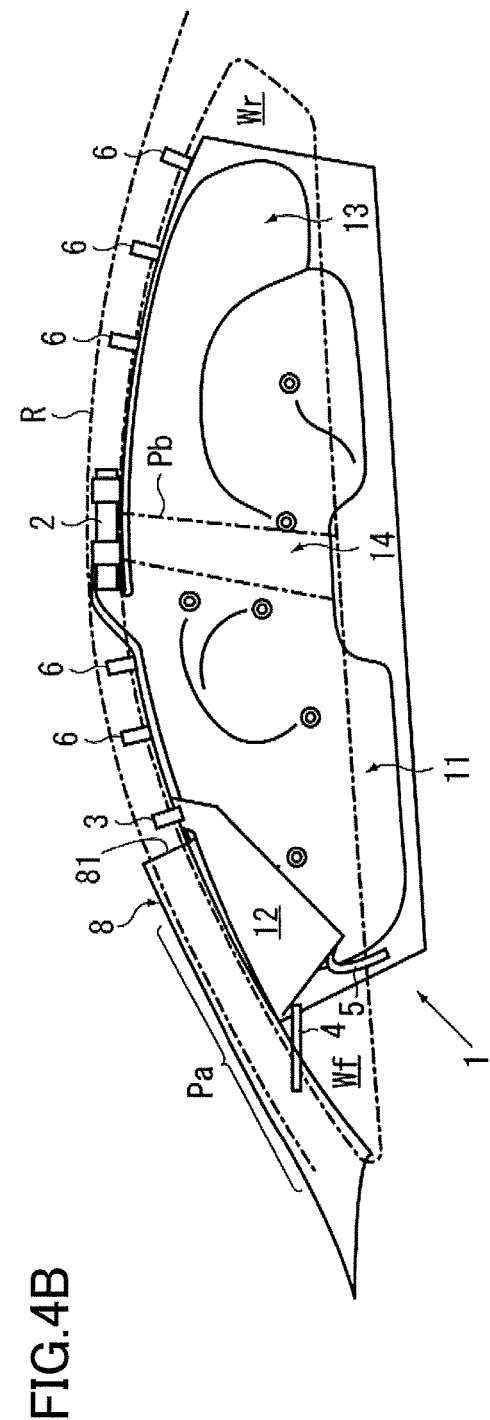

Next, the curtain airbag 1 according to a second embodiment of the present invention will be described with reference to FIGS. 4A and 4B. Here, FIGS. 4A and 4B are views showing the curtain airbag according to the second embodiment of the present invention, in which FIG. 4A is a planar expanded view and FIG. 4B is a side view of the initial state of inflation and expansion. Note that the same components as those of the curtain airbag 1 according to the above-described first embodiment are denoted by the same reference numerals, and redundant descriptions are omitted.

As shown in FIG. 4B, the curtain airbag 1 according to the second embodiment has the first end portion 31 of the connecting member 3 connected rearward of a rear end portion 81 of a garnish 8 disposed at the A pillar Pa. For example, as shown in FIG. 4A, the curtain airbag 1 according to the second embodiment is configured such that the connecting position of the second end portion 32, that is, the position of the non-inflatable portion 18, is shifted rearward relative to the curtain airbag 1 according to the first embodiment, while substantially maintaining the mounting angle of the connecting member 3. With such a configuration, it is possible to avoid interference between the second end portion 32 of the connecting member 3 and the non-inflatable portion 18 and the corner portion of the garnish 8, when the curtain airbag 1 is inflated and expanded.

Next, the curtain airbag 1 according to other embodiments of the present invention will be described with reference to FIGS. 5A through 5F. FIGS. 5A through 5F are partial plan views showing the curtain airbag according to other embodiments of the present invention, in which FIG. 5A shows a third embodiment, FIG. 5B shows a fourth embodiment, FIG. 5C shows a fifth embodiment, FIG. 5D shows a sixth embodiment, FIG. 5E shows a seventh embodiment, and FIG. 5F shows an eighth embodiment. Note that the same components as those of the curtain airbag 1 according to the above-described first embodiment are denoted by the same reference numerals, and redundant descriptions are omitted.

In the curtain airbag 1 according to the third embodiment shown in FIG. 5A, the slit 18*a* of the non-inflatable portion 18 is omitted. In the present embodiment, the second end portion 32 of the connecting member 3 is sewn to the rear surface (rear panel side) of the curtain airbag 1.

In the curtain airbag 1 according to the fourth embodiment shown in FIG. 5B, the connecting member 3 is omitted. At the time of inflation and expansion, in a case where the positioning of the curtain airbag 1 can be performed by the strap 4 and the plurality of tabs 6, the connecting member 3 may be omitted. In this case, it is unnecessary to form a place for sewing the connecting member 3; and therefore the non-inflatable portion 18 having a certain area can also be omitted as shown in the figure.

In the curtain airbag 1 according to the fifth embodiment shown in FIG. 5C, the non-inflatable portion 18 is expanded along the boundary line 17. In this way, the boundary line 17 partitioning the front chamber 11 and the sub-chamber 12, may be separated from the suture line of the front chamber 11, and the non-inflatable portion 18 may be formed in the middle of the front chamber 11 and the sub-chamber 12. With this configuration, it is possible to adjust the contact point between the sub-chamber 12 and the front chamber 11 at the time of inflation and expansion, so that the sub-chamber 12 can be easily bent.

The curtain airbag 1 according to the sixth embodiment shown in FIG. 5D is obtained by dividing the sub-chamber 12 and the front chamber 11 along the boundary line 17. Specifically, a cut line 18b is inserted in the non-inflatable portion 18 in the fifth embodiment shown in FIG. 5C. In the present embodiment, the slit 18a may be omitted, and the second end portion 32 of the connecting member 3 may be guided to the front surface of the front chamber 11 side through the cut line 18b and sewn to the front chamber 11. According to the sixth embodiment, the sub-chamber 12 can be easily folded, and the flexibility of the sub-chamber 12 at the time of inflation and expansion can also be improved.

The curtain airbag 1 according to the seventh embodiment shown in FIG. 5E is obtained by expanding the sub-chamber 12 along the A pillar Pa. More specifically, the lateral width of the sub-chamber 12 in the plane-expanded state is expanded forward, so that substantially the entire area of the A pillar Pa can be covered when the sub-chamber 12 is inflated and expanded. In this way, the size of the sub-chamber 12 can be set at any size, according to the protection range of the A pillar Pa.

In the curtain airbag 1 according to the eighth embodiment shown in FIG. 5F, the front sub-chamber 11b of the front chamber 11 is omitted. In the present embodiment, the front chamber 11 is constituted by one chamber. Even with such a configuration, similar to the curtain airbag 1 according to the above-described first embodiment, the sub-chamber 12 can be inflated and expanded after the sub-chamber 12 is discharged into the vehicle interior, simultaneously with the inflation and expansion of the front chamber 11.

The present invention is not limited to the specific embodiments described in the detailed description, and variations and modifications may be made without departing from the spirit and scope of the present invention.

The present application is based on Japanese priority application No. 2017-006531 filed on Jan. 18, 2017 with the Japanese Patent Office, the entire contents of which are hereby incorporated by reference.

What is claimed is:

1. A curtain airbag that is folded and stored in an upper portion of a vehicle body under normal circumstances, and that is inflated and expanded along a side window in emergency situations, the curtain airbag comprising:
    a front chamber configured to be inflated and expanded along the side window of a front seat of the vehicle body;
    a first gas supply port configured to supply gas to the front chamber, the first gas supply port being disposed at an upper portion of the front chamber;
    a sub-chamber that is smaller than the front chamber and that is disposed above the front chamber; and
    a second gas supply port that is disposed rearward of the sub-chamber, said second gas supply port communicating with the first gas supply port, and being narrower than the first gas supply port,
    wherein the sub-chamber is stored in a state of being folded on a front surface of the front chamber on a side facing an interior of the vehicle body at a portion of the second gas supply port,
    a boundary line partitioning the front chamber and the sub-chamber is disposed along a pillar of the vehicle body, and
    the curtain airbag further comprises:
        a connecting member including a first end portion connected to the vehicle body, and a second end portion connected to a portion adjacent to the second gas supply port on the boundary line.

2. The curtain airbag according to claim 1, wherein the first end portion is connected rearward of a rear end portion of a garnish disposed on the A pillar.

3. The curtain airbag according to claim 1, further comprising:
    a tether including a first end portion connected to a front of the sub-chamber, and a second end portion connected to a front of the front chamber,
    wherein a length of the tether is shorter than a linear distance between a connection point of the first end portion and a connection point of the second end portion.

4. The curtain airbag according to claim 1, further comprising:
    a non-inflatable portion disposed on a boundary line partitioning the front chamber and the sub-chamber.

5. The curtain airbag according to claim 4, wherein the non-inflatable portion includes a slit formed along the boundary line.

6. A curtain airbag apparatus comprising:
    the curtain airbag according to claim 1; and
    an inflator configured to supply gas to the curtain airbag.

7. A method for manufacturing a curtain airbag apparatus including a curtain airbag that is folded and stored in an upper portion of a vehicle body under normal circumstances, and that is inflated and expanded along a side window in emergency situations, and an inflator configured to supply gas to the curtain airbag,
    the curtain airbag including
        a front chamber configured to be inflated and expanded along the side window of a front seat of the vehicle body;
        a first gas supply port configured to supply the gas to the front chamber, the first gas supply port being disposed at an upper portion of the front chamber;
        a sub-chamber that is smaller than the front chamber and that is disposed above the front chamber; and
        a second gas supply port that is disposed rearward of the sub-chamber, said second gas supply port communicating with the first gas supply port, and being narrower than the first gas supply port,
    the method comprising:
        folding the sub-chamber on a front surface of the front chamber on a side facing an interior of the vehicle body at a portion of the second gas supply port; and
        folding a folded body obtained by the sub-chamber folding step, into a state where the folded body can be stored in the upper portion of the vehicle body,
    wherein the curtain airbag includes a tether including a first end portion connected to a front of the sub-chamber, and a second end portion connected to a front of the front chamber,
    the method further comprises sewing the first end portion of the tether to the sub-chamber before the sub-chamber folding step, and sewing the second end portion of the tether to the front chamber after the sub-chamber folding step.

8. A curtain airbag that is folded and stored in an upper portion of a vehicle body under normal circumstances, and that is inflated and expanded along a side window in emergency situations, the curtain airbag comprising:

a front chamber configured to be inflated and expanded along the side window of a front seat of the vehicle body;

a first gas supply port configured to supply gas to the front chamber, the first gas supply port being disposed at an upper portion of the front chamber;

a sub-chamber that is smaller than the front chamber and that is disposed above the front chamber;

a second gas supply port that is disposed rearward of the sub-chamber, said second gas supply port communicating with the first gas supply port, and being narrower than the first gas supply port, and a non-inflatable portion disposed on a boundary line partitioning the front chamber and the sub-chamber, wherein the sub-chamber is stored in a state of being folded on a front surface of the front chamber on a side facing an interior of the vehicle body at a portion of the second gas supply port, said sub-chamber being folded before the front chamber is folded.

* * * * *